United States Patent
Chilakapati et al.

(10) Patent No.: US 11,790,463 B2
(45) Date of Patent: Oct. 17, 2023

(54) INSPECTION PROJECT MANAGER

(71) Applicant: Evident Scientific, Inc., Waltham, MA (US)

(72) Inventors: Vijay Chilakapati, Hollis, NH (US); Gregory Bauer, W. Newton, MA (US); Vishal Dharmadhikari, Waltham, PA (US)

(73) Assignee: Evident Scientific, Inc., Waltham, MA (US)

( * ) Notice: Subject to any disclaimer, the term of this patent is extended or adjusted under 35 U.S.C. 154(b) by 641 days.

(21) Appl. No.: 16/824,953

(22) Filed: Mar. 20, 2020

(65) Prior Publication Data
US 2021/0150639 A1 May 20, 2021

Related U.S. Application Data

(60) Provisional application No. 62/936,775, filed on Nov. 18, 2019.

(51) Int. Cl.
  *G06Q 50/04* (2012.01)
  *G06Q 10/10* (2023.01)
  (Continued)

(52) U.S. Cl.
  CPC .............. *G06Q 50/04* (2013.01); *G06N 5/04* (2013.01); *G06N 20/00* (2019.01); *G06Q 10/10* (2013.01);
  (Continued)

(58) Field of Classification Search
  None
  See application file for complete search history.

(56) References Cited

U.S. PATENT DOCUMENTS 4,998,208 A * 3/1991 Buhrow ............... F17D 5/00
              702/34
9,672,486 B1 6/2017 Turpin
              (Continued)

FOREIGN PATENT DOCUMENTS

WO   2021101999   5/2021

OTHER PUBLICATIONS

Hexagon PPM, Smart Isometric Product Sheet, Apr. 2019, retrieved from https://bynder.hexagon.com/rn/3ca699b803c1fb5d/original/Hexagon_PPM_Smart_Isometrics_Product_Sheet_A4_2019.pdf (Year: 2019).*

(Continued)

*Primary Examiner* — Frank D Mills
(74) *Attorney, Agent, or Firm* — Schwegman Lundberg & Woessner, P.A.

(57) ABSTRACT

A system comprises a server including a port, memory and processing circuitry. The port is configured to receive (i) a drawing file associated with an isometric drawing of an asset at an inspection site including indications of condition monitoring locations (CMLs) for the asset, and (ii) inspection measurement data for the asset, the inspection measurement data including inspection measurements associated with the CMLs. The memory is configured to store the drawing file and the inspection measurement data. The processing circuitry is configured to use the inspection data and the drawing file to generate, using the inspection measurement data and the drawing file, (i) survey image data for display and (ii) metadata for the survey image data, the metadata including survey image coordinates for the CMLs and the inspection measurements associated with the CMLs.

20 Claims, 8 Drawing Sheets

(51) Int. Cl.
  *G06N 20/00* (2019.01)
  *G06T 11/20* (2006.01)
  *G06N 5/04* (2023.01)
  *G01B 17/02* (2006.01)

(52) U.S. Cl.
  CPC ............ *G06T 11/206* (2013.01); *G01B 17/02* (2013.01); *G06T 2200/24* (2013.01)

(56) References Cited

U.S. PATENT DOCUMENTS

| | | | |
|---|---|---|---|
| 2014/0207419 A1* | 7/2014 | Messinger | G01N 29/043 703/1 |
| 2014/0207874 A1 | 7/2014 | Soorianarayanan et al. | |
| 2015/0169190 A1* | 6/2015 | Girardeau | G06T 11/00 715/771 |
| 2018/0039715 A1* | 2/2018 | Vänskä | G06F 3/0481 |
| 2018/0357613 A1* | 12/2018 | Engelbart | G06Q 10/06311 |
| 2019/0005465 A1 | 1/2019 | Taylor et al. | |
| 2019/0087990 A1* | 3/2019 | Hournbuckle, Jr. | G06F 3/04817 |
| 2019/0146448 A1* | 5/2019 | Lee | G05B 19/41875 700/109 |
| 2019/0316902 A1* | 10/2019 | Sparago | G01B 21/08 |
| 2019/0377836 A1* | 12/2019 | Metzler | G06F 30/18 |

OTHER PUBLICATIONS

Courtney, David, Jim Livie, and Tim Littler. "Smart asset management using online monitoring." In Proceedings of Centre International de Recherche sur l'Environnement et le Développement (CIRED), 24th International Conference & Exhibition on Electricity Distribution, pp. 12-15. 2017. (Year: 2017).*

"International Application Serial No. PCT US2020 061059, International Preliminary Report on Patentability dated Jun. 2, 2022", 9 pgs.

"International Application Serial No. PCT US2020 061059, International Search Report dated Mar. 2, 2021", 4 pgs.

"International Application Serial No. PCT US2020 061059, Written Opinion ted Mar. 2, 2021", 7 pgs.

"European Application Serial No. 20824784.1, Response filed Dec. 29, 2022 to Communication pursuant to Rules 161(2) and 162 EPC", 12 pgs.

"Canadian Application Serial No. 3,161,292, Office Action dated Jun. 15, 2023", 4 pgs.

* cited by examiner

```
ID0004.02              0.341 INE----T
ID1--.--IN00011 T      00--.--IN
ID0004.04              0.344 INE----T
ID1--.--IN00011 T      00--.--IN
ID0004.05              0.336 INE----T
ID1--.--IN00011 T      00--.--IN
ID0004.06              0.347 INE----T
ID1--.--IN00011 T      00--.--IN
ID0005.02              0.344 INE----T
ID1--.--IN00011 T      00--.--IN
ID0005.04              0.332 INE----T
ID1--.--IN00011 T      00--.--IN
ID0005.05              0.336 INE----T
ID1--.--IN00011 T      00--.--IN
ID0005.06              0.341 INE----T
ID1--.--IN00011 T      00--.--IN
ID0006.05              0.175 INE----T
ID1--.--IN00011 T      00--.--IN
ID0006.06              0.170 INE----T
ID1--.--IN00011 T      00--.--IN
```

INSPECTION PROJECT MANAGER

CROSS-REFERENCE TO RELATED APPLICATION

This application claims the benefit of priority to U.S. Provisional Patent Application Ser. No. 62/936,775, filed on Nov. 18, 2019, the contents of which are incorporated herein by reference in their entirety.

TECHNICAL FIELD

This document relates to automated inspection systems and in particular to a service application to generate an interactive inspection survey.

BACKGROUND

Inspections for manufacturing or processing plant facilities typically involve sending an inspector into the field to perform measurements of the plant system. Usually, the inspector is given a drawing indicating where to take the readings, and data from the inspection is hand written on the drawing. The hand-written inspection data from the drawing is then later entered into a platform (e.g., a computer system). The field location and conditions can make it difficult to hand write the data and the hand-written data can be difficult to read when trying to enter the data into the platform.

OVERVIEW

Systems and methods for an automated inspection system are described that improve efficiency of managing and processing the inspection data. A system for automatic generation of an interactive survey for site inspection comprises a server including: a port configured to receive (i) a drawing file associated with an isometric drawing of an asset of an inspection site including indications of condition monitoring locations (CMLs) for the asset, and (ii) inspection measurement data for the asset, the inspection measurement data including inspection measurements associated with the CMLs; a memory configured to store the drawing file and the inspection measurement data; and processing circuitry configured to generate, using the inspection measurement data and the drawing file, (i) survey image data for display and (ii) metadata for the survey image data, the metadata including survey image coordinates for the CMLs and the inspection measurements associated with the CMLs.

A method of automatically generating an interactive survey for asset inspection comprises receiving inspection data for the asset at a server, the inspection data referenced by condition monitoring locations (CMLs) of the asset; receiving a drawing file associated with an isometric drawing of the asset at the server, the isometric drawing including indications of the CMLs; and generating, by a processor of the server and using the inspection data and the drawing file, survey image data for display and metadata for the survey image data, the metadata including coordinates in the survey image of the CMLs and inspection data for the CMLs.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various implementations discussed in the present document.

FIG. 4 is an example of inspection data.

DETAILED DESCRIPTION

Figure 1:
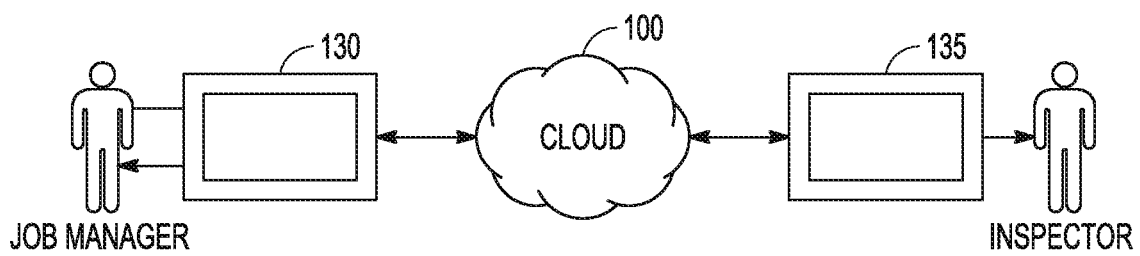
FIG. 1 is a functional block diagram of a cloud-based work-flow system.

FIG. 1 is a functional block diagram of a cloud-based workflow system. A job manager can create an interactive inspection survey by uploading files to the cloud 100. The job manager can also load inspection measurements from the cloud 100. The inspector can access the interactive survey at the inspection site (e.g., using a portable computing device), perform the inspection and can synchronize the inspection data to the cloud.

The term "cloud" is used herein to refer to a hardware abstraction. Instead of one dedicated server processing the uploaded files to create the interactive inspection survey, uploading the files to the cloud can include sending the file to a data center or processing center. The actual server used to process the files and create the inspection survey may be interchangeable at the data center or processing center.

Figure 2:
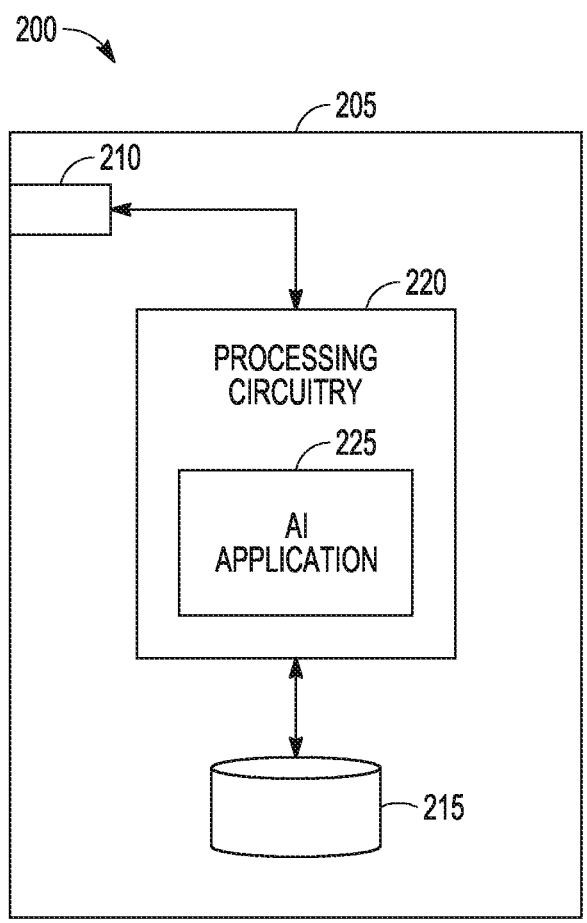
FIG. 2 is a block diagram of an example of portions of a system for automatic generation of an interactive survey for plant inspection.

FIG. 2 is a block diagram of an example of portions of a system for automatic generation of an interactive survey for plant inspection. The system 200 includes a server 205. The server 205 includes a port 210 to receive files for creating the interactive inspection survey and a memory 215 to store the files. The files include a drawing file for an asset at an inspection site and a file including inspection measurement data. The drawing file is associated with an isometric drawing of the asset that is being inspected.

Figure 3:
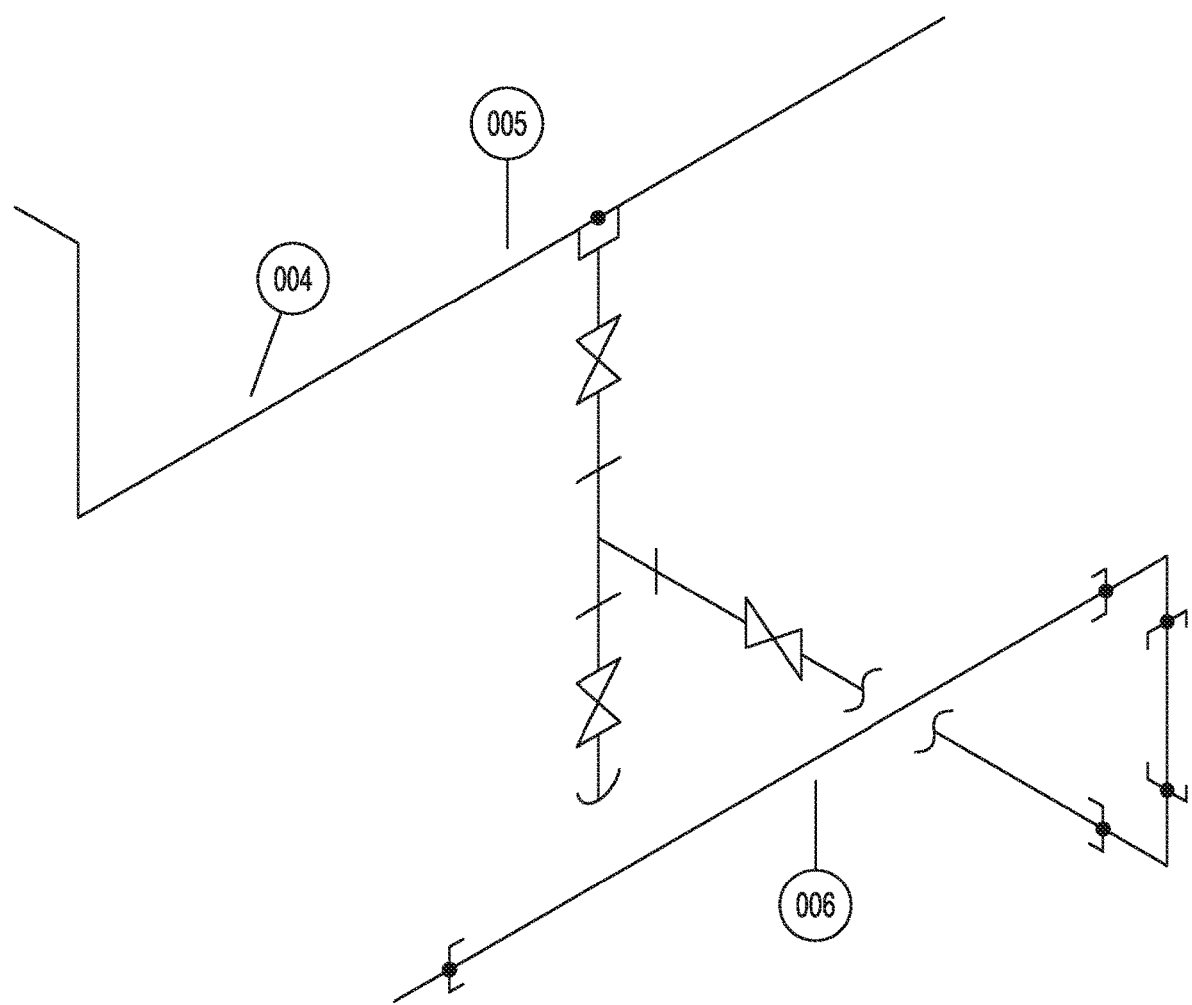
FIG. 3 is an example of a drawing file of a portion of an asset to be inspected.

FIG. 3 is an example of a drawing file of a portion of an asset for inspection. The example of FIG. 3 is a portable document format (.pdf) drawing of a portion of a schematic for a circuit of the asset and includes pipe and valves of the circuit. The drawing file includes indications of the condition monitoring locations (CMLs) of the asset where inspection measurements will take place. The CMLs (labeled 004, 005, 006 in FIG. 3) in the drawing file may be determined by the job manager.

FIG. 4 is an example of inspection measurement data that may be included in a file uploaded to the server. The inspection measurement data in FIG. 4 represents pipe thickness data taken with an ultrasound thickness tester or gauge. The inspection measurement data can include previous inspection measurements taken at the CMLs. The inspection measurement data may be measurements associated with the CMLs. For example, the label "ID004.xx" indicates previous measurements taken at CML 004, the label "ID005.xx" indicates previous measurements taken at CML 005, and the label "ID006.xx" indicates previous measurements taken at CML 006. The inspection measurement data may be in a file transfer protocol (FTP) file format.

Returning to FIG. 2, a user may upload the drawing file and the file with inspection measurement data to the server 205. The server 205 also includes processing circuitry (e.g., one or more processors). The server processing circuitry 220 is configured (e.g., by software) to use the inspection data and the drawing file to generate (i) survey image data for display and (ii) metadata for the survey image data. The metadata includes survey image coordinates of the CMLs and the inspection measurement data previously obtained for the CMLs. For example, the metadata for the survey image can include the X-Y coordinates of a CML in the survey image and previous inspection measurements associated with the CML. In some examples, the coordinates are relative coordinates (e.g., to a vertex of the survey image) rather than absolute X-Y coordinates or longitude/latitude locations.

Figure 5:
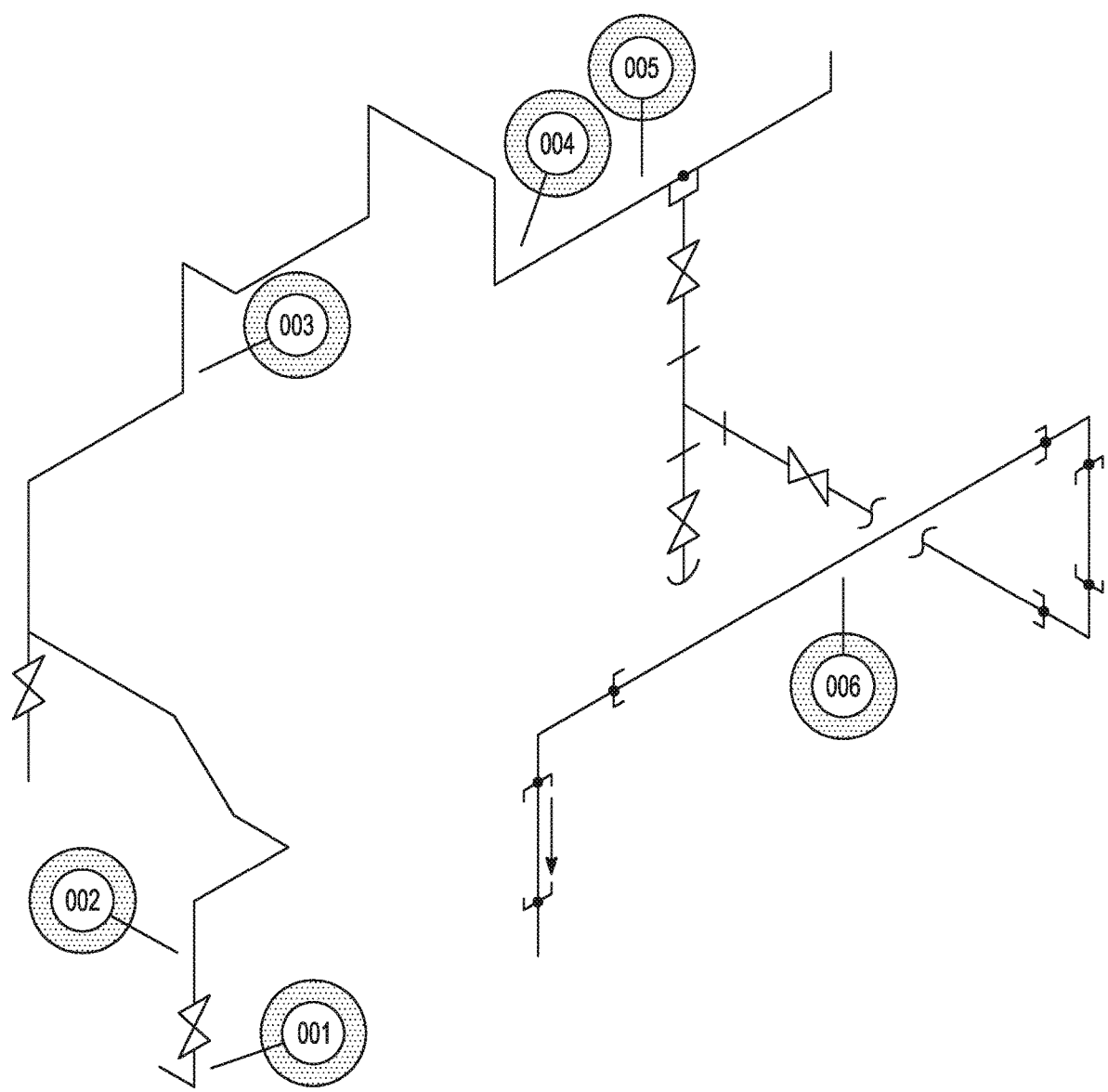
FIG. 5 is a diagram of an example of image for an interactive inspection survey.

FIG. 5 is a diagram of an example of image for an interactive inspection survey. The interactive survey image 500 shows an expanded view of the plant circuit shown in the example drawing of FIG. 3 and includes CMLs labeled 001 through 006. The CMLs are shown highlighted by larger circles. An inspector in the field downloads the survey image data to a portable computing device such as a tablet computer. The highlighted CMLs are interactive to the user. An interaction such as tapping on a highlighted CML using a touch-sensitive display causes the computing device to display the inspection measurements for that CML. Additional user interactions with the interactive inspection survey are possible and are described elsewhere herein.

Returning to FIG. 2, the system includes a service application 225. The service application 225 includes an artificial intelligence (AI) algorithm. The server processing circuitry 220 performs the AI algorithm using the inspection measurement data and the drawing file to generate the survey image data for display and the metadata for the survey image data. In some examples, the server processing circuitry 220 performs a computer vision algorithm to generate the survey image data for display and metadata for the survey image data. The computer vision algorithm can include one or more of optical character recognition (OCR), image recognition and image tagging. In certain examples, server processing circuitry 220 applies the computer vision algorithm to a PDF drawing and an FTP data file to generate the survey image data for display and metadata for the survey image data.

The system also includes a computing device remote from the server 205. In FIG. 1, the remote computing device may be a computing device 130 used by the job manager to create workflow assignments or may be a portable computing device 135 (e.g., a tablet computer) used by an inspector in the field. The remote computing device includes a communication port, a user interface including a display, and processing circuitry. The remote computing device receives data from the server 205 via the communication port. The received data includes the survey image data and the metadata. The processing circuitry is configured (e.g., by software) to use the received survey image data and the metadata to generate the interactive survey image of the asset for presentation on the display. The interactive survey image may be an isometric drawing of the asset and includes user interactive indications of the CMLs of the asset, such as the highlighted circles in FIG. 5. In response to a user prompt received at an indication for the CML, the processing circuitry displays inspection data associated with a CML.

If the remote computing device is the portable computing device 135 for on-site inspection, the remote computing device can receive measurement information from the inspection of the asset. In some examples, the inspector enters the measurement information using the user interface. In some examples, the communication port of the remote computing device is able to communicate wirelessly, such as by using the Bluetooth® protocol or other wireless protocol, with an automatic measurement device. In an illustrative example intended to be non-limiting, the measurement device can be an ultrasound measurement device configured to collect pipe thickness information of a circuit of an asset and communicate the information with the communication port of the portable computing device of the inspector.

In some examples, a measurement device is located at each of the CMLs of the asset. To get the measurement information from the measurement devices, the inspector in the field can log into the portable computing device 135 using the user interface. The inspector may click or otherwise interact with a "Start Survey" icon on the display to launch the interactive inspection survey. The user may also Pause and Resume the interactive survey through the user interface. Launching the survey may cause the portable computing device to pair with a measurement device of a CML for communication. When the devices are paired, the inspection measurement data for the CML is available to the inspector.

Figure 6:
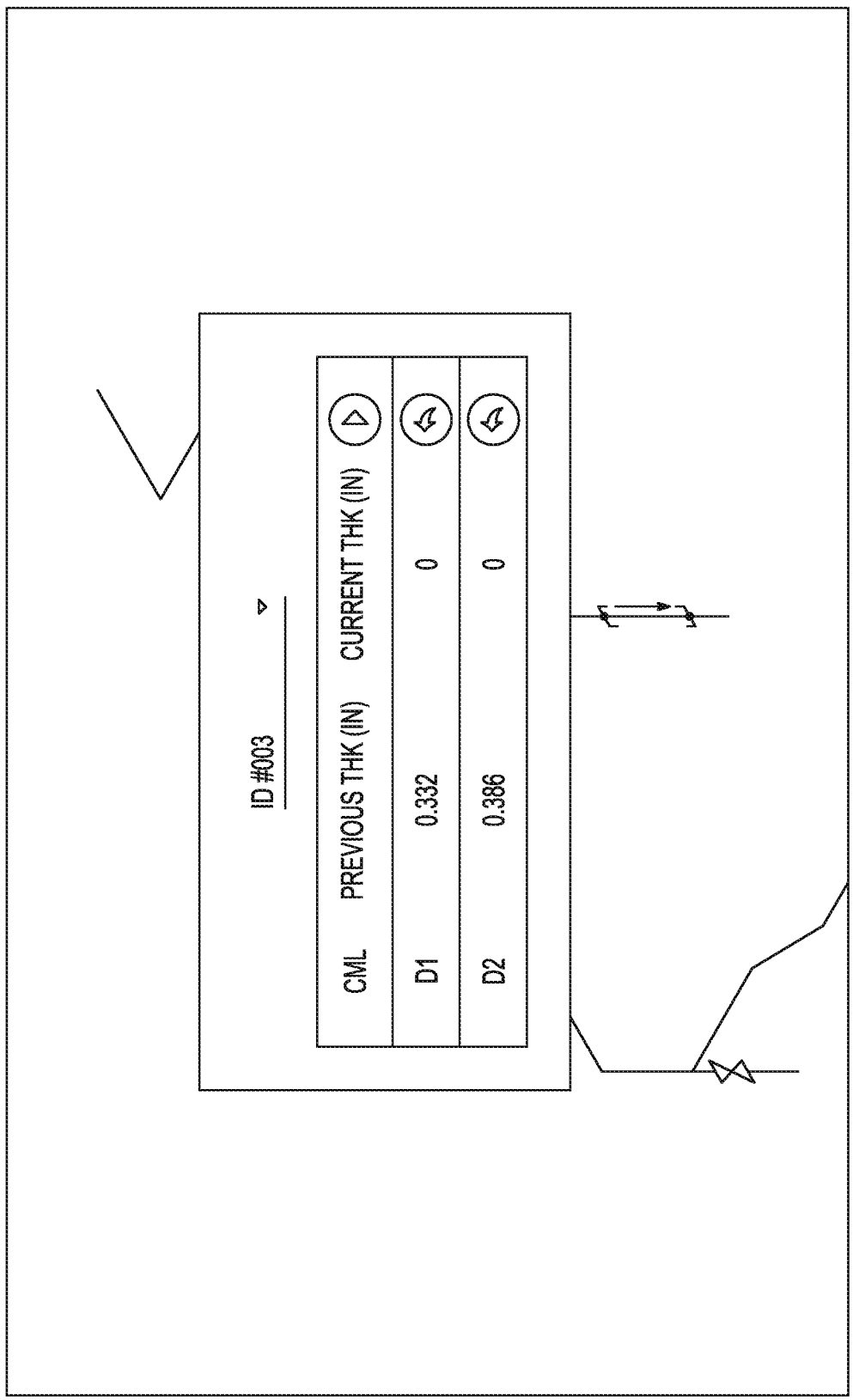
FIG. 6 is an illustration of a display showing an example of a screen of an interactive inspection survey.

FIG. 6 is an illustration of a display of a portable computing device showing an example of a screen of the interactive inspection survey. The user may tap on an interactive indication of the CML to display the number of measurement points at a specific CML and see what the previous measurements were at the CML during past inspections. In the example of FIG. 6, the user tapped on the indication for CML 003 (ID #003) and previous measurements of pipe thickness for the pipe located at CML 003 are displayed.

The inspector may use the user interface of the portable computing device or the automatic measurement device to obtain a new measurement. For example, the inspector may tap on the arrow in the display of the portable computing device to request a new measurement or the inspector may use a user interface of the automatic measurement device at the CML to send a new measurement. The inspector continues obtaining new data for other CMLs of the interactive inspection survey. The processing circuitry of the portable computing device may update the metadata of the survey image with the measurement information and send updated metadata to the server or cloud.

The interface between the portable computing device and the measurement device may include an auto-send feature for hands free data collection. Keeping the hands of the inspector free can be desired for safety reasons at the inspection site. When the portable computing device and the automatic measurement device are paired, a measurement is automatically sent to the portable computing device when the measurement is stable. A measurement may be deemed stable if the measurement is the same or within a specified range for a specified number of reading (e.g., a measurement is automatically sent when five successive measurements are with in the specified range). The auto-send feature allows an inspector to obtain measurements without requiring the inspector to use the user interface of the portable computing device. It also prevents possible errors in the data from handwriting errors.

The portable computing device may be equipped with a camera that generates digital image data. For example, the portable computing device may be a tablet computer or smartphone. The inspector may use the camera to add a visual event to the inspection survey. To generate a visual event, the inspector may hold an indicator (e.g., a fingertip, pen, or cursor) over a location of the survey image corresponding to a location of the circuit where there is a visual concern (e.g., a leak, corrosion, suspected corrosion under insulation, etc.). The location may or may not correspond to a CML. Holding the indicator generates an indication on the survey image (e.g., a specific kind of circle to indicate a concern).

Figure 7:
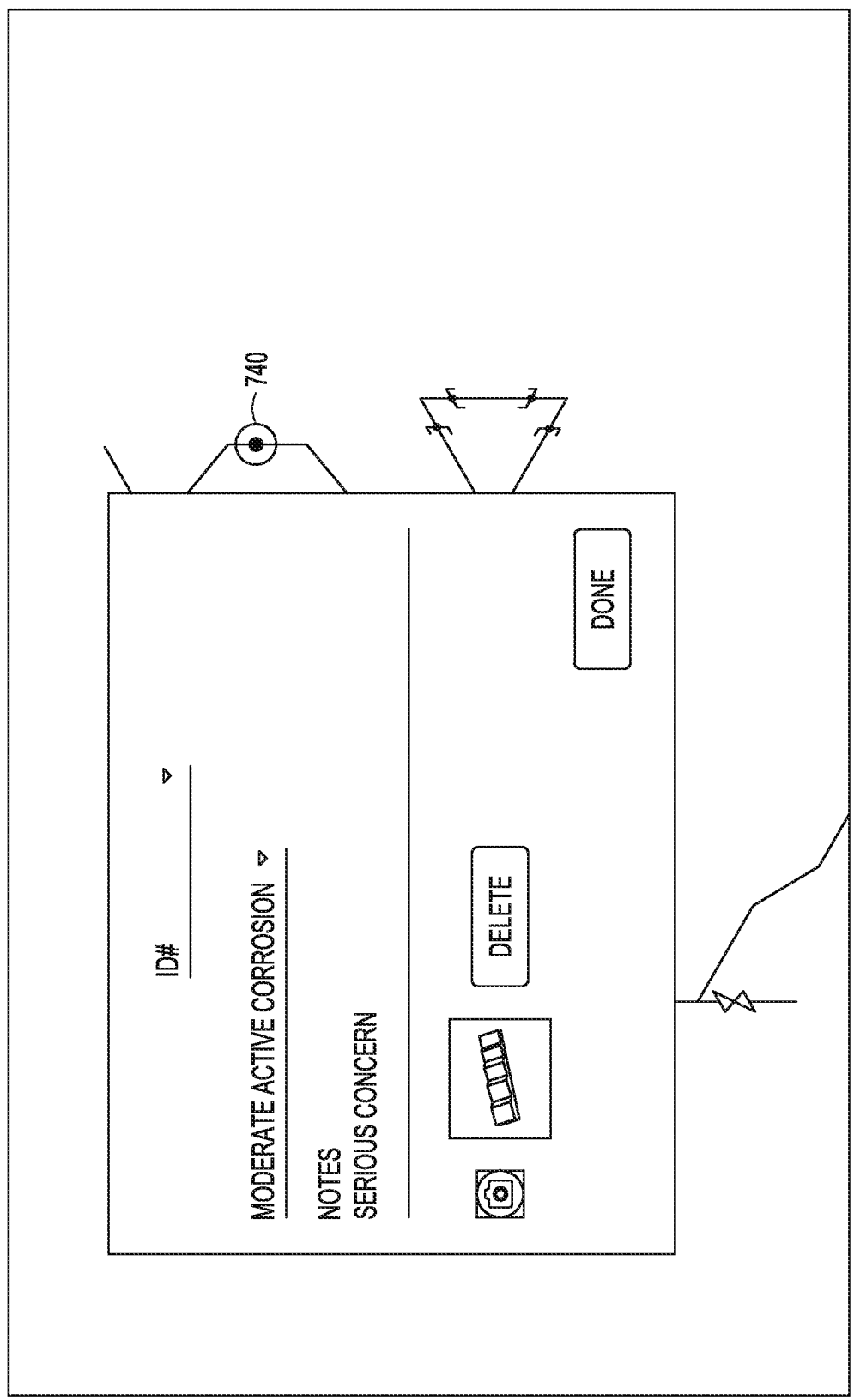
FIG. 7 is an illustration of a display showing an example of a screen of an interactive inspection survey.

FIG. 7 is an illustration of a display of a portable computing device showing another example of a screen of the interactive inspection survey. The inspector holds the indicator at a location to create an indication of a visual event on the survey image. In the Example of FIG. 7, the indicator is the two concentric circles 740. Color may be used to bring attention to a concern. For example, indications of CMLs may be blue and the indication of a visual event may be orange to indicate an issue. When an indication of the visual event is created, the inspector may tap on the indication and the interactive survey image may present a pop-up screen 745 as shown in FIG. 7. The inspector can use the pop-up screen to add the digital image and add text for the issue.

Thus, the interactive survey image allows the inspector to update the drawing in the field. If a connection to the Internet is available, the survey image updated with the image taken by the camera and the new inspection data can be immediately uploaded to the server.

The job manager can view the measurement information as soon as it is uploaded from the inspection site. In an office location, the job manager can refresh a web application to open the updated interactive inspection survey and see the new measurements just taken from the field and see any reported visual events. The job manager may set an alarm condition for the inspection, such as by setting a threshold for the inspection data for when an alarm should be reported. The alarm condition can be added to the metadata. It can be seen that this provides an improvement in efficiency and allows for faster decision making.

Figure 8A:
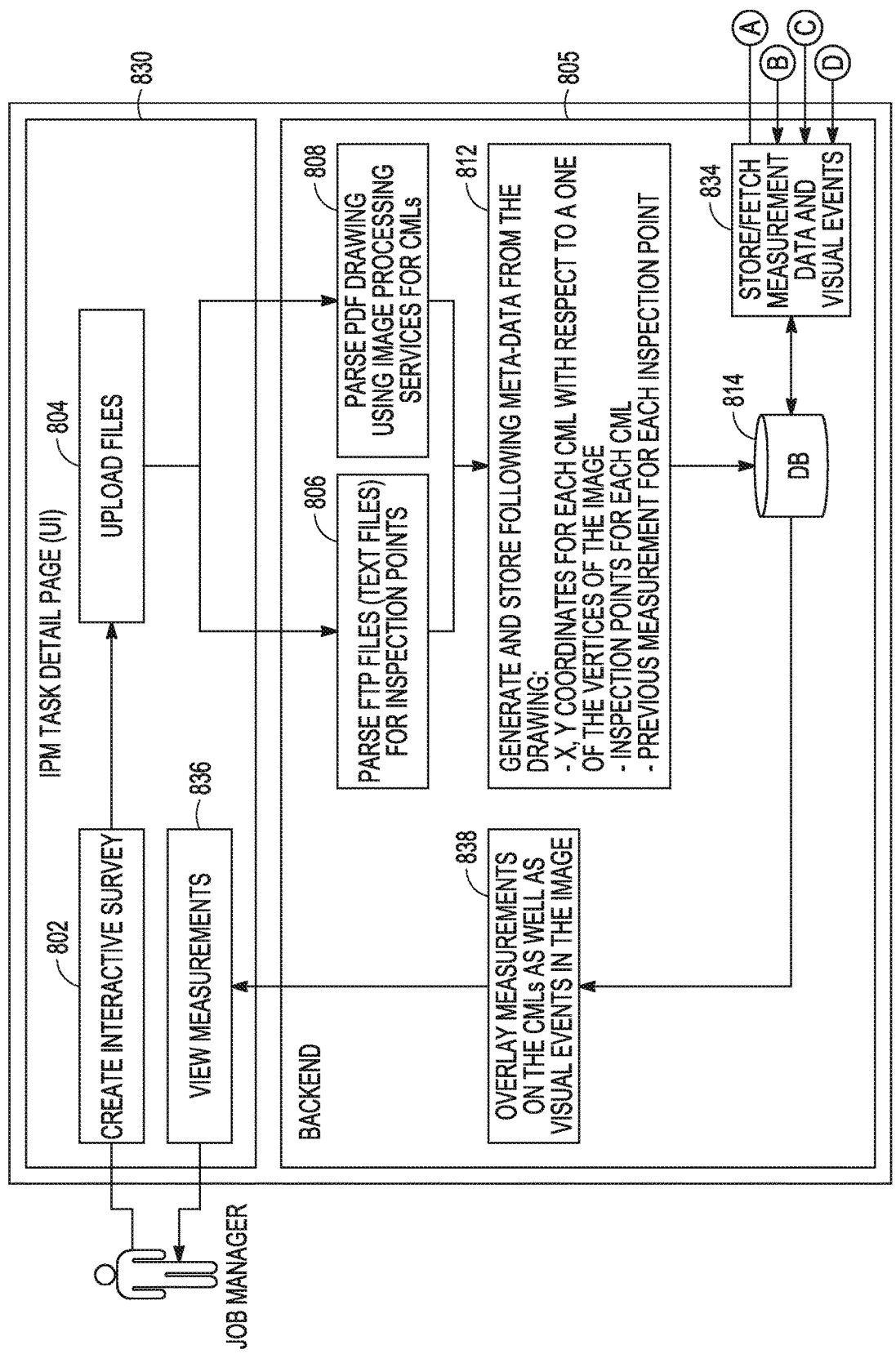
FIGS. 8A-8B show a flow diagram for a process to automatically generate an interactive inspection survey.
Figure 8B:
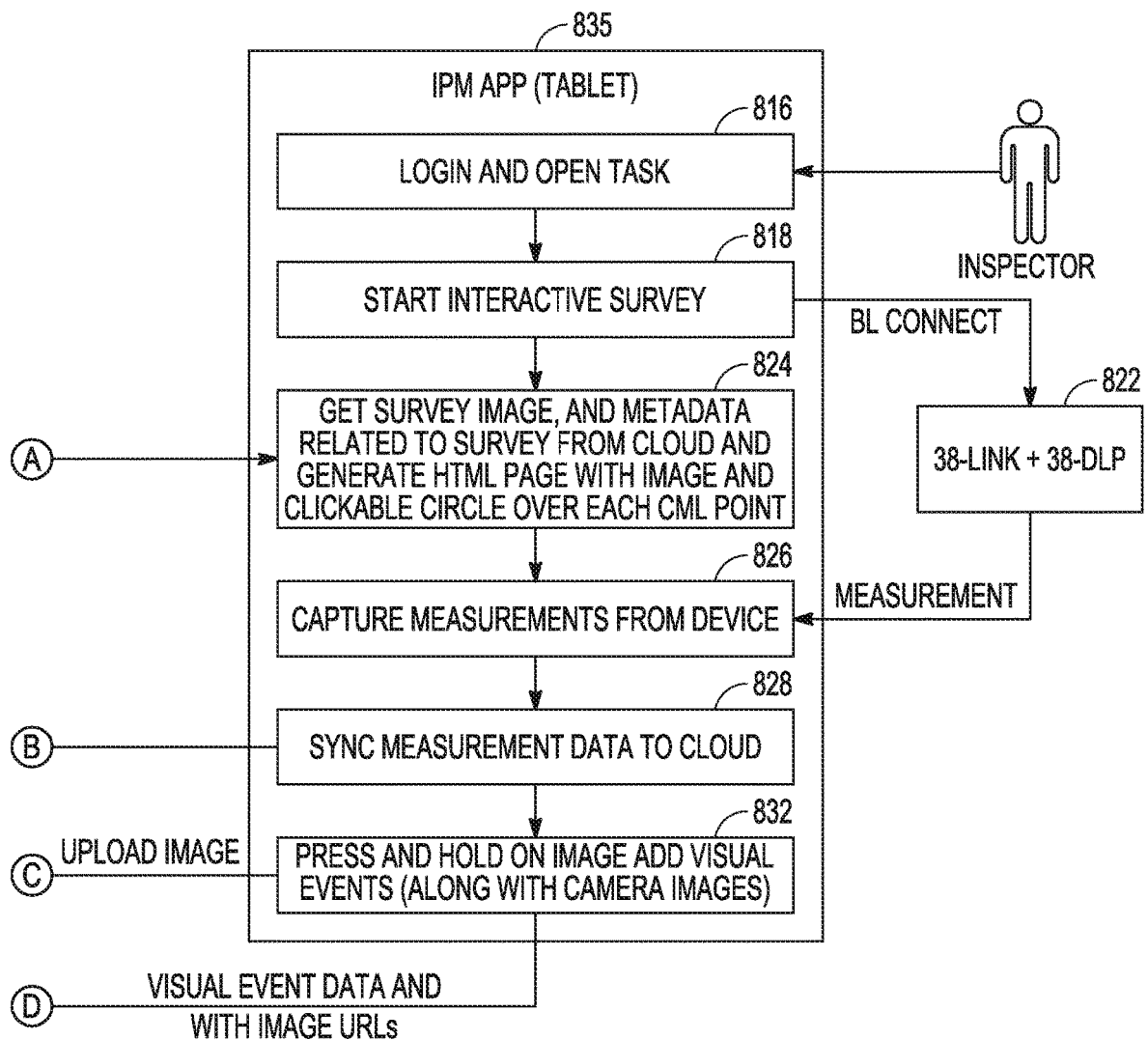

FIGS. 8A-8B show a flow diagram for a process to automatically generate an interactive inspection survey. FIG. 8A shows a system server 805 and a user interface 830 (UI). The server 805 may be a cloud server, and the process in FIG. 8A may be performed by the cloud. The job manager begins to create the interactive survey at 802 and uploads files for the interactive survey at 804. The files are received at the server 805. The files include asset inspection data and a drawing file. The asset inspection data may be in a text file in FTP format. The drawing file may be a PDF file. At 806, the server parses the inspection data for inspection points and at 808 the server processes the drawing file using image processing services.

At 812, the server generates and stores metadata. The processing circuitry of the server may perform an AI algorithm to parse the files and generate the metadata. The metadata includes X-Y coordinates for each CML with respect to a vertex of the survey image, inspection points for each CML, and previous measurements for each of the inspection points. The metadata and image data for an isometric survey image are stored in a database 814 (DB) of the server.

FIG. 8B shows a portable computing device 835 (e.g., a tablet computer) used by an inspector to perform the interactive inspection survey. At 816, the inspector logs into the portable computing device 835. At 818 the inspector starts the interactive inspection survey, such as by clicking a cursor on a start survey icon displayed on the computing device or tapping on the displayed icon. When the survey is started the portable computing device 835 may wirelessly pair to a measurement device, such as an ultrasonic thickness gauge 822.

At 824, the server 805 sends the survey image data and the metadata to the portable computing device 835. The portable computing device 835 generates an interactive survey image of the asset or portion of the asset on the display. The interactive survey image may be a hypertext markup language (HTML) web page with an isometric image of a flow circuit of the asset. The HTML page and image includes interactive indications (e.g., clickable circles) over each CML point of the asset. When the inspector performs some type of interaction with the CML indications (e.g., clicking or tapping a displayed CML indication) the interactive survey image may display previous measurements for the CML.

At 826, the portable computing device 835 captures measurements from the measurement device. The inspector may tap or click an icon on the portable computing device to request a measurement, or the inspector may use a user interface of the measurement device to send measurement data to the portable computing device. In some examples, an auto-send feature is used to capture the measurements.

At 828, the measurement data is synchronized to the cloud by uploading updated measurement data. As explained previously herein, the inspector may perform another type of interaction with the display (e.g., press and hold a display location) to add a visual event at 832. The visual events are also synchronized to the cloud by uploading the visual event data and image data. The uploaded measurement data, visual event data, and image data may be added to the metadata for the interactive inspection survey.

Returning to FIG. 8A, at 834 the server 805 stores the measurement data and any visual events in the database 814. If the job manager requests to view the measurements at 836, the server 805 overlays the measurements on the CMLs as well as including the visual events in the interactive survey image presented to the job manager. If a connection to the Internet is available to the portable computing device at the inspection site, the job manager can review the updated survey image as soon as the new data is uploaded to the cloud (e.g., by refreshing a web application) while the inspector is still in the field.

The devices, systems and methods described herein improve the efficiency of obtaining and processing inspection data. This allows for faster decision making for operation of the asset.

ADDITIONAL DESCRIPTION AND EXAMPLES

Example 1 includes subject matter (such as a system) comprising a server. The server includes a port configured to receive (i) a drawing file associated with an isometric drawing of an inspection site including indications of condition monitoring locations (CMLs) for the asset, and (ii) inspection measurement data for the asset, the inspection measurement data including inspection measurements associated with the CMLs; a memory configured to store the drawing file and the inspection measurement data; and processing circuitry configured to generate, using the inspection measurement data and the drawing file, (i) survey image data for display and (ii) metadata for the survey image data, the metadata including survey image coordinates for the CMLs and the inspection measurements associated with the CMLs.

In Example 2, the subject matter of Example 1 optionally includes server processing circuitry configured to generate the (i) survey image data for display and (ii) the metadata for the survey image data using an artificial intelligence algorithm.

In Example 3, the subject matter of Example 2 optionally includes a computer vision algorithm including one or more of optical character recognition (OCR), image recognition and image tagging.

In Example 4, the subject matter of one or any combination of Examples 1-3 optionally includes inspection measurement data for the asset including thickness measurement data for the asset.

In Example 5, the subject matter of one or any combination of Examples 1-4 optionally includes a computing device remote from the server. The remote computing device includes a communication port configured to receive the survey image data; a display; and processing circuitry configured to generate an isometric drawing of the asset for display using the survey image data.

In Example 6, the subject matter of one or any combination of Examples 1-4 optionally includes a computing device remote from the server. The remote computing device includes a communication port configured to receive the survey image data and the metadata; a user interface including a display; and processing circuitry. The processing circuitry is configured to generate an interactive survey image of the asset for presentation on the display using the survey image data and the metadata, the interactive survey image including user interactive indications of the CMLs of the asset; receive a notification of a user prompt at a first interactive indication associated with a first CML of the CMLs; and display inspection data associated with the first CML in response to the user prompt.

In Example 7, the subject matter of Example 6 optionally includes a communication port of the remote computing device configured to receive measurement information from a measurement device located at a CML of the asset; and processing circuitry configured to update the metadata of the survey image with the measurement information; and send the updated metadata to the server.

In Example 8, the subject matter of Example 7 optionally includes a communication port configured to receive pipe thickness information for pipe located at the CML from an ultrasound measurement device.

In Example 9, the subject matter of one or any combination of Examples 5-8 optionally includes a computing device that includes a camera configured to generate digital image data; and processing circuitry of the remote computing device is configured to add the digital image data to the survey image data in response to a second type of user prompt received by the user interface.

Example 10 includes subject matter (such as a method of automatically generating an interactive survey for site inspection) or can optionally be combined with one or any combination of Examples 1-9 to include such subject matter, comprising receiving inspection measurement data for an asset of an inspection site at a server, the inspection measurement data including inspection measurements associated with condition monitoring locations (CMLs) of the asset; receiving a drawing file associated with an isometric drawing of the asset at the server, the isometric drawing including indications of the CMLs; and generating, by a processor of the server and using the inspection measurement data and the drawing file, (i) survey image data for display and (ii) metadata for the survey image data, the metadata including survey image coordinates for the CMLs and the inspection measurements associated with the CMLs.

In Example 11, the subject matter of Example 10 optionally includes sending the survey image data and the metadata from the server to a remote computing device that includes a user interface; generating an interactive survey image of the asset on a display of the remote computing device using the survey image data and the metadata, the interactive survey image including user interactive indications of the CMLs of the asset; and displaying inspection measurements associated with a CML in response to a first type of user prompt received at an indication for the CML.

In Example 12, the subject matter of Example 11 optionally includes receiving measurement information from a measurement device located at a CML of the asset using the remote computing device; updating the metadata of the survey image with the measurement information; and sending the updated metadata to the server.

In Example 13, the subject matter of Example 12 optionally includes receiving thickness measurement information for the asset from an ultrasound measurement device located at the CML.

In Example 14, the subject matter of one or both of Examples 12 and 13 optionally includes the remote computing device adding image data for a location of the asset to the survey image in response to a second type of user prompt received by the user interface.

In Example 15, the subject matter of one or any combination of Examples 10-14 optionally includes a processor of the server applying an artificial intelligence algorithm to the inspection measurement data and the drawing file to generate (i) the survey image data for display and (ii) the metadata for the survey image data.

In Example 16, the subject matter of Example 15 optionally includes the server applying a computer vision algorithm to the inspection measurement data for the asset and isometric drawing of the asset to generate the survey image data for display and metadata for the survey image data, wherein the computer vision algorithm includes one or more of optical character recognition (OCR), image recognition and image tagging.

In Example 17, the subject matter of one or any combination of Examples 10-16 optionally includes sending the survey image data and the metadata from the server to a remote computing device that includes a user interface having a display; and generating a survey image of the asset on the display, wherein the interactive survey image is an isometric drawing of the asset.

In Example 18, the subject matter of one or any combination of Examples 10-17 optionally includes receiving thickness measurements for pipe of the asset and receiving a drawing file includes receiving a drawing file representing an isometric circuit drawing for the pipe of the asset.

Example 19 includes subject matter or can optionally be combined with one or any combination of Example 1-18 to include such subject matter (such as a computer readable storage medium including instructions that, when executed by processing circuitry of a server, cause the server to perform acts) comprising receiving inspection measurement data for an asset of an inspection site at a server, the inspection measurement data including inspection measurements associated with condition monitoring locations (CMLs) of the asset; receiving a drawing file associated with an isometric drawing of the asset at the server, the isometric drawing including indications of the CMLs; and generating, using the inspection measurement data and the drawing file, (i) survey image data for display and (ii) metadata for the survey image data, the metadata including survey image coordinates for the CMLs and inspection measurements associated with the CMLs.

In Example 20, the subject matter of Example 19 optionally includes generating the (i) survey image data for display and (ii) the metadata for the survey image data using a computer vision algorithm that includes one or more of optical character recognition (OCR), image recognition and image tagging.

These non-limiting Examples can be combined in any permutation or combination. The above detailed description includes references to the accompanying drawings, which form a part of the detailed description. The drawings show, by way of illustration, specific implementations in which the invention can be practiced. These implementations are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects. Method examples described herein can be machine or computer-implemented at least in part.

The above description is intended to be illustrative, and not restrictive. For example, the above-described examples (or one or more aspects thereof) may be used in combination with each other. Other implementations can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. A system for automatic generation of an interactive survey for site inspection of an asset, the system comprising:
    a server including:
        a port configured to receive (i) a drawing file associated with an isometric drawing of an inspection site including indications of asset condition monitoring locations (asset CMLs) for the asset, and (ii) inspection measurement data for the asset, the inspection measurement data including inspection measurements associated with the asset CMLs;
        a memory configured to store the drawing file and the inspection measurement data; and
        processing circuitry configured to:
            generate, using the inspection measurement data and the drawing file, the interactive survey including (i) survey image data for display, (ii) user-interactive CMLs for display corresponding to the asset CMLs, and (iii) metadata for the survey image data, the metadata including survey image coordinates for the asset CMLs and the inspection measurements associated with the asset CMLs; and
            initiate sending the generated interactive survey to a separate device; and
            wherein a prompt received by a user-interactive CML of the interactive survey initiates pairing with an automatic measurement device of an asset CML corresponding to the user-interactive CML to cause the measurement device of the asset CML to take a new measurement and update the metadata of the survey image with the new measurement information.

2. The system of claim 1, wherein the server processing circuitry is configured to generate the (i) survey image data for display and (ii) the metadata for the survey image data using an artificial intelligence algorithm.

3. The system of claim 2, wherein the artificial intelligence algorithm is a computer vision algorithm including one or more of optical character recognition (OCR), image recognition and image tagging.

4. The system of claim 1, wherein the inspection measurement data includes thickness measurement data for the asset.

5. The system of claim 1, including a computing device remote from the server, the remote computing device including:
    a communication port configured to receive the survey image data;
    a display; and
    processing circuitry configured to generate an isometric drawing of the asset for display using the survey image data.

6. The system of claim 1, including a computing device remote from the server, the remote computing device including:
    a communication port configured to receive the survey image data and the metadata;
    a user interface including a display; and
    processing circuitry configured to:
        generate the interactive survey image of an asset for presentation on the display using the survey image data and the metadata, the interactive survey image including the user-interactive CMLs;
        receive a notification of a user prompt at a first user-interactive CML of the interactive survey image associated with a first CML of the CMLs; and display inspection data associated with the first CML in response to the user prompt.

7. The system of claim 6, wherein the communication port of the remote computing device is further configured to receive the new inspection data information from a measurement device located at a CML of the asset in response to a prompt received by a corresponding user-interactive CML of the user-interactive survey image; and wherein the processing circuitry of the remote computing device is configured to:
update the metadata of the survey image with the measurement information; and
send the updated metadata to the server.

8. The system of claim 7, wherein the communication port is configured to receive pipe thickness information located at the CML from an ultrasound measurement device.

9. The system of claim 6,
wherein the remote computing device includes a camera configured to generate digital image data; and
wherein the processing circuitry of the remote computing device is configured to add the digital image data to the survey image data in response to a second type of user prompt received by the user interface.

10. A method of automatically generating an interactive survey for site inspection, the method comprising:
receiving inspection measurement data for an asset of an inspection site at a server, the inspection measurement data including inspection measurements associated with asset condition monitoring locations (asset CMLs);
receiving a drawing file associated with an isometric drawing of the asset at the server, the isometric drawing including indications of the CMLs; and
generating, by a processor of the server and using the inspection measurement data and the drawing file, the interactive survey that includes (i) survey image data for display, (ii) user-interactive CMLs for display corresponding to the asset CMLs, and (iii) metadata for the survey image data, the metadata including survey image coordinates for the asset CMLs and the inspection measurements associated with the asset CMLs; wherein a prompt received by a user-interactive CML of the interactive survey initiates pairing with an automatic measurement device of an asset CML corresponding to the user-interactive CML to cause the measurement device of the asset CML to take a new measurement and update the metadata of the survey image with the new measurement information.

11. The method of claim 10, including:
sending the survey image data and the metadata from the server to a remote computing device that includes a user interface;
generating an interactive survey image of the asset on a display of the remote computing device using the survey image data and the metadata, the interactive survey image including the user-interactive CMLs; and
displaying inspection measurements associated with an asset CML in response to a first type of user prompt received via a user-interactive CML corresponding to the asset CML.

12. The method of claim 11, including:
receiving measurement information from the measurement device located at the asset CML using the remote computing device in response to the prompt received by the user-interactive CML corresponding to the asset CML;
updating the metadata of the survey image with the measurement information; and
sending the updated metadata to the server.

13. The method of claim 12, wherein receiving the measurement information includes receiving thickness measurement information for the asset from an ultrasound measurement device located at the asset CML.

14. The method of claim 12, including the remote computing device adding image data for a location of the asset to the survey image in response to a second type of user prompt received by the user interface.

15. The method of claim 10, wherein the generating the survey image data includes a processor of the server applying an artificial intelligence algorithm to the inspection measurement data and the drawing file to generate (i) the survey image data for display and (ii) the metadata for the survey image data.

16. The method of claim 15, wherein the generating the survey image data includes the server applying a computer vision algorithm to the inspection measurement data for the asset and isometric drawing of the asset to generate the survey image data for display and metadata for the survey image data, wherein the computer vision algorithm includes one or more of optical character recognition (OCR), image recognition and image tagging.

17. The method of claim 10, including:
sending the survey image data and the metadata from the server to a remote computing device that includes a user interface having a display; and
generating the interactive survey image of the asset on the display, wherein the interactive survey image is an isometric drawing of the asset.

18. The method of claim 10, wherein the receiving inspection data includes receiving thickness measurements of the asset and receiving a drawing file includes receiving a drawing file representing an isometric circuit drawing for the asset.

19. A non-transitory computer readable storage medium including instructions that, when executed by processing circuitry of a server, cause the server to perform acts comprising:
receiving inspection measurement data for an asset at an inspection site at a server, the inspection measurement data including inspection measurements associated with asset condition monitoring locations (asset CMLs) for the asset;
receiving a drawing file associated with an isometric drawing of the asset at the server, the isometric drawing including indications of the asset CMLs; and
generating, using the inspection measurement data and the drawing file, an interactive survey including (i) survey image data for display, (ii) user-interactive CMLs for display corresponding to the asset CMLs, and (iii) metadata for the survey image data, the metadata including survey image coordinates for the CMLs and inspection measurements associated with the asset CMLs; wherein a prompt received by a user-interactive CML of the interactive survey initiates pairing with an automatic measurement device of an asset CML corresponding to the user-interactive CML to cause the measurement device of the asset CML to take a new measurement and update the metadata of the survey image with the new measurement information.

20. The non-transitory computer readable storage medium of claim 19, including instructions that cause the processing circuitry to perform acts comprising:

generating the (i) survey image data for display and (ii) the metadata for the survey image data using a computer vision algorithm that includes one or more of optical character recognition (OCR), image recognition and image tagging.

\* \* \* \* \*